United States Patent
Gnayem et al.

(10) Patent No.: US 9,943,833 B2
(45) Date of Patent: Apr. 17, 2018

(54) BISMUTH OXYHALIDE COMPOUNDS USEFUL AS PHOTOCATALYSTS

(75) Inventors: Hani Gnayem, Baqa-El-Gharbia (IL); Yoel Sasson, Jerusalem (IL); Sanaa Shenawi-Khalil, Jerusalem (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 785 days.

(21) Appl. No.: 13/885,267

(22) PCT Filed: Nov. 16, 2011

(86) PCT No.: PCT/IL2011/000888
§ 371 (c)(1),
(2), (4) Date: Aug. 29, 2013

(87) PCT Pub. No.: WO2012/066545
PCT Pub. Date: May 24, 2012

(65) Prior Publication Data
US 2013/0334145 A1    Dec. 19, 2013

Related U.S. Application Data

(60) Provisional application No. 61/414,003, filed on Nov. 16, 2010, provisional application No. 61/531,628, filed on Sep. 7, 2011.

(51) Int. Cl.
C02F 1/32      (2006.01)
B01J 27/06     (2006.01)
(Continued)

(52) U.S. Cl.
CPC ............... B01J 27/06 (2013.01); B01J 27/08 (2013.01); B01J 27/10 (2013.01); B01J 35/004 (2013.01);
(Continued)

(58) Field of Classification Search
CPC . B01J 19/123; B01J 27/06; B01J 27/08; B01J 27/10; B01J 35/0033; B01J 35/004;
(Continued)

(56) References Cited

U.S. PATENT DOCUMENTS 4,252,570 A    2/1981  Shannon
6,464,772 B1   10/2002 Vermoortele et al.
(Continued)

FOREIGN PATENT DOCUMENTS

CN        101 186 336     5/2008

OTHER PUBLICATIONS

CN101186336 Qinglin et al.—Method for preparing layer thickness homogenized bismuth oxyhalide (Abstract & MT; May 28, 2008).*
(Continued)

*Primary Examiner* — Dirk Bass
*Assistant Examiner* — Hayden Brewster
(74) *Attorney, Agent, or Firm* — Nixon & Vanderhye P.C.

(57) ABSTRACT

Mixed chloride-bromide bismuth oxyhalide compounds, with the molar ratio chloride:bromide being equal to or greater than 1:1, in the form of microspheres exhibiting flower-like surface morphology, are disclosed. Processes for preparing the compounds, formulations of the compounds and a method for purifying water using said compounds are also disclosed.

8 Claims, 9 Drawing Sheets

(51) Int. Cl.

| | |
|---|---|
| *B01J 27/08* | (2006.01) |
| *B01J 27/10* | (2006.01) |
| *B01J 35/00* | (2006.01) |
| *B01J 37/02* | (2006.01) |
| *C01G 29/00* | (2006.01) |
| *C02F 1/72* | (2006.01) |
| C02F 1/30 | (2006.01) |
| *B01J 37/03* | (2006.01) |
| C02F 101/30 | (2006.01) |

(52) U.S. Cl.
CPC ....... *B01J 35/0033* (2013.01); *B01J 37/0221* (2013.01); *B01J 37/0244* (2013.01); *C01G 29/006* (2013.01); *C02F 1/32* (2013.01); *C02F 1/725* (2013.01); *B01J 37/03* (2013.01); *C01P 2002/50* (2013.01); *C01P 2002/72* (2013.01); *C01P 2004/03* (2013.01); *C01P 2004/32* (2013.01); *C01P 2004/61* (2013.01); *C01P 2006/12* (2013.01); *C01P 2006/16* (2013.01); *C02F 2101/30* (2013.01); *C02F 2305/10* (2013.01); *Y02W 10/37* (2015.05)

(58) Field of Classification Search
CPC .... B01J 37/0221; B01J 37/0244; B01J 37/03; B32B 9/00; C01B 9/00; C04B 14/00; C02F 1/30; C02F 1/32; C02F 1/325; C02F 1/72; C02F 1/722; C02F 1/725; C02F 2101/30; C02F 2305/10; C09C 1/00; C09C 1/0006; C01G 29/00; C01G 29/006; C01P 2002/50; C01P 2002/72; C01P 2004/03; C01P 2004/32; C01P 2004/61; C01P 2006/12; C01P 2006/16; C01P 2006/60; C01P 2006/62; Y02W 10/37

USPC ...... 106/288, 291, 479; 210/748.09, 748.14; 423/462, 466, 468, 472; 428/403, 404, 428/462.468, 479; 502/224
See application file for complete search history.

(56) References Cited

U.S. PATENT DOCUMENTS

| | | | |
|---|---|---|---|
| 6,558,553 B1 * | 5/2003 | Amal ..................... | B01J 35/002 210/695 |
| 2007/0054044 A1 * | 3/2007 | Shimosaki ............ | B01J 35/004 427/248.1 |

OTHER PUBLICATIONS

Zhang et al. (Self-Assembled 3-D Architectures of BiOBr as a Visible Light-Driven Photocatalyst, Chem. Mater, 20, pp. 2937-2941 (Apr. 8, 2008)).*
Jia et al. (Simple Solvothermal Routes to Synthesize 3D BiOBrx11-x Microspheres and Their Visible-Light-Induced Photocatalytic Properties (Apr. 2011).*
Zhang et al., "Generalized One-Pot Synthesis Characterization, and Photocatalytic Activity of Hierarchical BiOX (X) Cl, Br, I) Nanoplate Microspheres", *J. Phys. Chem. C*, vol. 112, Jan. 3, 2008, pp. 747-753.
Keller et al., "A Strong Deviation from Vegard's Rule: X-Ray Powder Investigations of the Three Quasi-Binary Phase Systems BiOX-BiOY (X, Y = Cl, Br, I)", Chemical Sciences, vol. 60, No. 12, 2005, pp. 1255-1263.
Wang et al., Visible-light-responsive photocatalysts ABiOBR-(1-x)BiOI, *ScienceDirect*, vol. 9, 2008, pp. 8-12.
Wang et al., "ABiOBR-(1-x)BiOCl as efficient visible-light-driven photocatalysts", *ScienceDirect*, vol. 56, 2007, pp. 669-672.
International Search Report for PCT/IL2011/000888, dated Jan. 7, 2013.
Written Opinion for PCT/IL2011/000888, dated Jan. 7, 2013.

* cited by examiner

BISMUTH OXYHALIDE COMPOUNDS USEFUL AS PHOTOCATALYSTS

This application is the U.S. national phase of International Application No. PCT/IL2011/000888 filed 16 Nov. 2011 which designated the U.S. and claims priority to U.S. Provisional Application Nos. 61/414,003 filed 16 Nov. 2010 and 61/531,628 filed 7 Sep. 2011, the entire contents of each of which are hereby incorporated by reference.

Compounds exhibiting photocatalytic activity are capable of accelerating oxidation reactions in the presence of light irradiation and are hence potentially useful in decomposing organic contaminants present in water. The $TiO_2$ powder manufactured by Degussa Corporation under the name P-25 is an example of a commercially available photocatalyst.

Bismuth oxyhalides of the formula BiOHal, wherein Hal indicates halogen atom, are known in the art for use in the photocatalysis of oxidation reactions of organic matter in the presence of visible light irradiation. Mixed bismuth oxyhalides of the formulas $BiOCl_yI_{1-y}$ and $BiOBr_yI_{1-y}$ have also been reported as photocatalysts, with their activity being dependent on the relative amounts of the two halides, namely, on the y/1-y ratio [Wang et al., Scripta Materials 56, p. 669-672 (2007); Wang et al., catalysis Communications 9, p. 8-12 (2008)].

U.S. Pat. No. 4,252,570 describes solid solutions having the formula $BiOI_{1-x-y}Br_xCl_y$, wherein x is from 0 to 0.8, y is from 0 to 0.3 and x+y is from 0.1 to 0.8, which are useful as pigments. These iodide-containing bismuth oxyhalides are prepared by mixing a solution of bismuth nitrate in acetic acid with an aqueous solution containing sodium acetate, alkali iodide and either alkali bromide or chloride, or both.

U.S. Pat. No. 6,464,722 discloses bismuth and vanadium containing compounds of the formula (1-n){BiVO_4}n{BiOX}, wherein X is halogen, which are useful as pigments. The BiOX component may be a mixed, bismuth oxyhalide, preferably the iodide-bromide. Keller et al. [Zeitschrift fuer Naturforschung, B: Chemical Sciences, 60(12), 1255-1263 (2005)] report the preparation of mixed bismuth oxyhalides, including $BiOCl_{1-x}Br_x$, by means of milling and blending pure bismuth oxyhalides (e.g., BiOCl and BiOBr) in suitable molar ratios, melting the resultant mixture and solidifying same.

It has now been found that mixed bismuth oxyhalide compounds of the formula $BiOCl_yBr_{1-y}$ are powerful visible-light induced photocatalysts and that their activity is linked not only to their composition (i.e., the molar ratio chloride/bromide), but also to the surface morphology of the crystalline $BiOCl_yBr_{1-y}$ particles. In particular, under the preferred reaction conditions set forth below, the $BiOCl_yBr_{1-y}$ compound is obtained in the form of fairly spherical particles (microspheres) with an organized cell-like or flower-like microstructure which appears to make it especially suitable for use as photocatalysts, with an activity superior to that demonstrated by particles exhibiting plate-like surface morphology.

The present invention is therefore primarily directed to mixed chloride-bromide bismuth oxyhalide compounds, with the molar ratio chloride:bromide being equal to or greater than 1:1, in the form of microspheres exhibiting flower-like surface morphology, said microspheres being characterized by the presence of individual thin sheets arranged radially in petal-like manner, wherein two or more adjacent individual thin sheets are interconnected to form cells or channels which open onto the external surface of said microspheres.

The mixed chloride-bromide bismuth oxyhalides of the invention have the formula $BiOCl_yBr_{1-y}$, with the chloride being the predominant halide, y preferably being between 0.5 and 0.95, more preferably between 0.6 and 0.95, and even more preferably between 0.7 and 0.95 (e.g., 0.75-0.90, especially 0.80-0.90).

The compounds of the invention are prepared by a process comprising: combining a bismuth source, a chloride source and a bromide source in an acidic environment, forming precipitate and collecting the solid thereby formed.

The pH of the reaction mixture is preferably less than 3.0, and even more preferably less than 2.0, e.g., from 1.0 to 1.8, and more specifically around 1.5. The acidic environment is preferably provided by means of an organic acid or an aqueous solution of an organic acid.

The process set forth above, which forms another aspect of the invention, is preferably carried out by charging a reaction vessel with an acid, dissolving the bismuth source in the acidic environment, adding the chloride and bromide sources to the solution, precipitating a product of the formula $BiOCl_yBr_{1-y}$ wherein y is from 0.6 and 0.95, separating the solid product from the liquid phase, washing and drying (in air) said solid product.

A bismuth source suitable for use in the process of the invention is a bismuth compound which decomposes under acidic environment to release bismuth ions. To this end, bismuth compounds, such as bismuth nitrate $(Bi(NO_3)_3 \cdot 5H_2O)$, bismuth chloride $(BiCl_3)$ or bismuth oxide $(Bi_2O_3)$ are suitable for use, with the bismuth nitrate being especially preferred. It has been found advantageous to generate the acidic environment by means of an organic acid such as glacial acetic acid or formic acid, or an aqueous mixture of an organic acid, in which the bismuth source is dissolved, and then to supply the chloride and bromide ions to the solution through the addition of organic halide salts, such as quaternary ammonium chloride and bromide salts. Preferred salts are represented by the formulas $N^+R_1R_2R_3R_4Cl^-$ and $N^+R_1R_2R_3R_4Br^-$, wherein $R_1$, $R_2$, $R_3$ and $R_4$ are alkyl, groups, which may be the same or different. For example, $R_1$, $R_2$ and $R_3$ are short chain alkyl groups (e.g., methyl groups) and $R_4$ is a long straight or branched alkyl chain, preferably a straight chain consisting of not less than 12 carbon atoms (e.g., not less than 16 carbon atoms). For example, halide sources which can be suitably used are selected from the group consisting of cetyltrimethylammonium bromide (abbreviated CTAB), cetyltrimethylammonium chloride (abbreviated CTAC), tetrabutylammonium chloride (abbreviated TBAC) and tetrabutylammonium bromide (abbreviated TBAB). The cationic surfactants described above (e.g., CTAB and CTAC) appear to function as Structure Directing Agents-SDAs, affecting the morphological structure of the resultant compounds, as discussed below.

The concentration of the bismuth salt in the acidic reaction mixture is preferably from 0.1M to 0.3M, e.g., from 0.12M to 0.25 M. When a mixture of water and organic acid is used, then the volumetric ratio between the aqueous and organic components is preferably from 2.20 to 3.20, e.g., 2.28 to 3.14. The dissolution of the bismuth salt in the acidic reaction mixture is carried out at room temperature (between 20 and 30° C.) under stirring.

The chloride and bromide salts are added essentially concurrently to the solution, either in a solid form or more preferably, in the form of separate or combined aqueous or alcoholic solutions. The chloride and bromide salts are used in stoichiometric amounts relative to the bismuth source, or in a slight molar excess, with the molar ratio chloride/ bromide being adjusted to give the desired $BiOCl_yBr_{1-y}$ compound. Preferably, the amounts of the chloride and bromide salts are adjusted to form the mixed $BiOCl_yBr_{1-y}$ compound in which the ratio y/1-y is not less than 2:1, and preferably from 3:1 to 8:1, inclusive, with a ratio of about 7:1 to 8:1 being especially preferred. On addition of the chloride and bromide sources, the product crystallizes instantaneously.

The solid is separated from the liquid phase by means of conventional methods, such as filtration or decantation, washed thoroughly (e.g., with ethanol and water), and dried in air or in a vacuum oven at 120° C. The dry powder can be further subjected to heat treatment at about 400° C. for about one hour, in order to remove traces of organic impurities.

It has been found that particle morphology is determined by the choice of process variables, and that the photocatalytic activity can be enhanced upon causing the $BiOCl_yBr_{1-y}$ particles to crystallize in the form of microspheres with cell-like or flower-like surface morphology. In particular, the morphology of the resultant product depends on the halide sources used, as indicated by images produced with a scanning electron microscope showing the microstructure of the powders prepared under different reaction conditions. When alkali halides, e.g., sodium chloride, sodium bromide, potassium chloride and potassium bromide are used in the reaction, then the product may be obtained in the shape of flake-like micron size particles (i.e., the material exhibits plate surface morphology, as clearly shown in FIGS. 2A-2G). However, it appears that the use of at least one organic halide source, e.g., of the $N^+R_1R_2R_3R_4Cl^-$ or $N^+R_1R_2R_3R_4Br^-$ as previously defined, modifies the morphology of the product and instead of a seemingly random plate-like morphology, the $BiOCl_yBr_{1-y}$ compound exhibits a surface morphology characterized by an organized flower-like microstructure, as shown in FIGS. 1A-1G. Thus, according to a preferred embodiment of the invention, the compounds of formula $BiOCl_yBr_{1-y}$ are in the form of microspheres exhibiting flower-like surface morphology. The term "$BiOCl_yBr_{1-y}$ microspheres having flower-like surface morphology" refers to $BiOCl_yBr_{1-y}$ microspheres characterized by the presence of individual thin sheets arranged radially like petals, wherein two or more adjacent individual thin sheets are interconnected to form cells or channels which open onto the external surface of said microspheres (as evidenced by images produced by scanning electron microscopy).

The diameter of the spherical particles of the preferred $BiOCl_yBr_{1-y}$ compounds of the invention is from 1.5 to 5 microns, more specifically from 2 to 3 microns. The distance between the flower's "leaves" is about 200 nm. The diameter of the open cells or channels of the preferred $BiOCl_yBr_{1-y}$ compounds is from 15 to 25 Å.

The preferred $BiOCl_yBr_{1-y}$ compounds provided by the present invention have a surface area of not less than 15 $m^2/g$, more preferably not less than 20 $m^2/g$, e.g., from 20 to 30 $m^2/g$, as determined by BET (the nitrogen adsorption technique).

It should be noted that as an alternative to the process set forth above, which is carried out in an acidic environment provided by an organic acid such as glacial acetic acid, it is possible to prepare the $BiOCl_yBr_{1-y}$ compounds through a hydrothermal procedure in the presence of a base. The hydrothermal procedure yields bismuth-containing solid phase, which is subsequently reacted with a mixture of chloride and bromide sources. More specifically, the hydrothermal procedure comprises the following steps: charging a reaction vessel with water and a source of bismuth ion, adding a base to the reaction vessel, subjecting the reaction mixture to hydrothermal treatment to form a bismuth-containing solid phase; and combining said bismuth-containing solid phase with chloride and bromide sources, e.g., with aqueous solutions of hydrochloric and hydrobromic acids. The aforementioned process involving the hydrothermal procedure forms another aspect of the invention.

The hydrothermal procedure is carried out as follows. A bismuth salt is added to water-containing reaction vessel and is allowed to dissolve or decompose therein, liberating bismuth ions in the aqueous solution. In practice, it is preferred to use a water-soluble bismuth salt such as bismuth nitrate (e.g., $Bi(NO_3)_3 \cdot 5H_2O$) at a concentration up to saturation, e.g., between 0.05 and 0.25 M, and more preferably between 0.095 and 0.19 M.

The bismuth-containing aqueous solution is stirred for a short period of time, preferably at room temperature, though heating can be applied in order to facilitate the dissolution/decomposition of the bismuth salt in case of need. Then, a base is added to the reaction vessel, causing the precipitation of bismuth hydroxide and the formation of a suspension. An especially suitable base is aqueous ammonium hydroxide ($NH_4OH$) or gaseous ammonia which can be bubbled into the reaction mixture.

The molar ratio of the base used to the bismuth salt starting material is preferably not less than 10:1, e.g., in the range of 10:1 to 13:1, preferably about 12:1. The pH of the reaction mixture is adjusted in the range of 10 to 12. To this end, the base is conveniently added to the reaction vessel in a dropwise manner under pH control. The reaction mixture is stirred for duration of about 10-60 minutes, e.g., about 15-30 minutes, affording an alkaline bismuth hydroxide suspension.

The hydrothermal treatment is carried out using a suitable vessel capable of withstanding high temperature and pressure. Thus, the reaction mixture, in the form of a suspension, is placed in an autoclave which is maintained at a temperature in the range of 130 to 180° C., and preferably between 150 and 180° C. for not less than 13 hours, e.g., between 14 and 18 hours. The autoclave is allowed to cool to room temperature. The solid product is then isolated by conventional techniques such as filtration, washed with water and optionally dried. The product thus collected is a bismuth-containing solid phase.

In order to obtain the $BiOCl_yBr_{1-y}$ compounds, the bismuth-containing solid phase recovered following the hydrothermal procedure is mixed with bromide and chloride sources, e.g., the corresponding acid halides. The acid halides are employed in the form of concentrated aqueous solutions of hydrochloric and hydrobromic acids. It is preferred to employ the acid halides in excess relative to the bismuth-containing solid phase, such that a mixed bismuth oxyhalide of the formula $BiOCl_yBr_{1-y}$ is formed. The respective amounts of the hydrochloric and hydrobromic acids are suitably adjusted to form the desired compound, namely, to control the Cl/Br ratio. Preferably, in this variant of the invention, the hydrochloric and hydrobromic acids are used in approximately equimolar amounts, generating the mixed $BiOCl_yBr_{1-y}$ compound in which y is about 0.5 (0.475-0.525).

The solid is separated from the aqueous phase by conventional methods, such as filtration, and dried in air. The product is collected in the form of flake-like micron size particles. Thus, the morphology of the $BiOCl_yBr_{1-y}$ compounds formed through the hydrothermal procedure is dominated by plates.

The $BiOCl_yBr_{1-y}$ compounds of the invention exhibits X-ray powder diffraction pattern having a characteristic peak in the range from 11.0 to 12.2 2θ (±0.05 2θ), which peak is indicative of the Cl:Br ratio. In other words, the exact position of the indicative peak within the 11.0-12.2 2θ interval depends essentially linearly on the Cl:Br ratio, as predicted by the Vegard rule. The chemical composition of the compound belonging to the family $BiOCl_yBr_{1-y}$ wherein y is as defined above can be determined using EDS analysis. The composition of the $BiOCl_yBr_{1-y}$ compound can be also determined using XRD data and Vegard's law, and other known methods (see also Wang, et al., supra).

It has been found that the $BiOCl_yBr_{1-y}$ compounds of the invention, in particular the $BiOCl_yBr_{1-y}$ microspheres having flower-like surface morphology, are powerful, visible-light induced photocatalysts which are more efficient than known non-mixed bismuth oxyhalides (i.e., BiOCl and BiOBr) and iodide-containing mixed bismuth oxyhalides. The $BiOCl_yBr_{1-y}$ compounds of the present invention may therefore be used in the light-induced catalysis of oxidation reactions of chemical pollutants.

The compounds of the invention have been found to exhibit high photocatalytic activity in decomposing organic contaminants present in water under UV-Vis and visible light irradiation. Specifically, the mixed bismuth oxyhalide may be used in purifying water contaminated by organic substances such as dyes and other aromatic or heteroaromatic compounds which may be substituted by carboxylic acid, amine, halogen and keto groups (for example, chlorophenols, acetophenones and chlorinated acetophenones). As illustrated in the Examples below, the compounds of the invention are useful in accelerating the degradation of Rhodamine B (RhB). This contaminant has the structure depicted below:

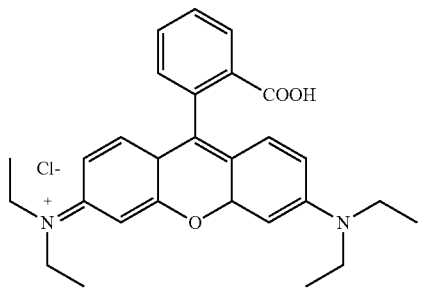

One preferred compound of the invention, $BiOCl_{0.8}Br_{0.2}$, decomposes RhB (15 ppm solution) within 2.5 minutes under sun irradiation and within 10 minutes using a PL 9 W table lamp. Another especially preferred compound, $BiOCl_{0.875}Br_{0.125}$, decomposes RhB (15 ppm solution) within 2 minutes at sun light. The $BiOCl_{0.5}Br_{0.5}$ and $BiOCl_{0.67}Br_{0.33}$ compounds decomposed RhB under identical conditions upon solar irradiation in 15 and 10 minutes, respectively (the $BiOCl_yBr_{1-y}$ compounds referred to above are all in the form of microspheres having flower-like surface morphology).

Accordingly, in another aspect, the invention provides a method for the purification of water, comprising combining the mixed bismuth oxyhalide photocatalyst of the formula $BiOCl_yBr_{1-y}$, as identified above, with water contaminated with organic compound(s), and irradiating the photocatalyst (e.g., with UV-Vis light (λ=385-740 nm) or visible light (λ≥422 nm)).

The purification method of the present invention involves feeding the contaminated water to be treated into a suitable reactor, e.g., a plug flow reactor made of glass and loaded with the catalyst (e.g., in a granular form), and irradiating said reactor, preferably at room temperature. Contaminated water is circulated through the irradiated packed reactor at a selected flow rate to secure a desired level of purification.

Useful UV-Vis and visible light sources include xenon arc lamps, halogen lamps or lasers. The experimental results reported below indicate that solar irradiation is also effective. In general, the irradiation period depends on the identity of the organic contaminant to be destroyed, its concentration in the aqueous medium, the catalyst employed and the loading of the catalyst in the reactor. The irradiation period is not less than 3-5 minutes, e.g., between about 10 minutes and several hours, and the progress of the decomposition of the targeted contaminants can be monitored using conventional techniques, such as spectroscopic methods.

The compounds of the invention may further be used for disinfection and prevention of biofouling. Bacterial adhesion and subsequent cell growth on the surface leads to biofouling, which is a widespread problem in engineered Systems, such as drinking water distribution pipes and water treatment membranes. The photocatalytically active compounds of the invention may be used to reduce or prevent biofouling. Bacteria can be killed following exposure to light irradiation in the presence of the photocatalysts of the invention.

It has been found that the mixed chloride-bromide bismuth oxyhalide compounds of the invention can be embedded in an adhesive matrix (e.g., siloxane-based matrix) which can be affixed to a surface of a substrate in the form of a thin film demonstrating photocatlytic activity in response to sun light irradiation. Thus, another aspect of the invention relates to a photocatalyst comprising a film applied on a substrate, wherein said film contains the mixed chloride-bromide bismuth oxyhalide compounds of the invention.

The film is preferably prepared by first dissolving the film-forming agent (e.g., a siloxane precursor such as tetraethyl orthosilicate) in an acidic aqueous solution, in which a water-miscible organic co-solvent is also present. Then, one or more organic compounds which are decomposable under calcination conditions are added to the siloxane solution (such that upon removal of said one or more organic compounds during the final calcination step, pores are formed in the siloxane matrix). The chloride-bromide bismuth oxyhalide compound of the invention, preferably in the form of a dispersion in said co-solvent, is then added to the siloxane solution and the resultant mixture is stirred. Finally, a thoroughly cleaned surface of a suitable substrate (e.g., a transparent glass) is coated with the dispersion. Following calcination, a thin film (with a thickness varying from 1 to 100 μm) affixed to the surface of the substrate is formed.

Another aspect of the invention relates to a magnetic, photocatalytically active composite comprising a magnetic core having a coating thereon and an outer layer comprising the mixed chloride-bromide bismuth oxyhalide compounds of the invention provided on said coating. The magnetic core comprises iron oxide (magnetite, $Fe_3O_4$) and the coating comprises silica. The size of the magnetic composite is several microns.

It should be noted that the process described above, comprising combining a bismuth source and an organic halide salt in an acidic environment, can be also used for precipitating and isolating a pure (non-mixed) bismuth oxyhalide of the formulas BiOCl or BiOBr, in the form of crystalline solids having the flower like surface morphology described above. The photocatalytic activity of the resultant BiOCl and BiOBr compounds is inferior to that demonstrated by the mixed bismuth oxyhalides $BiOCl_yBr_{1-y}$ of the invention. Nevertheless, the pure (non-mixed) BiOCl or BiOBr prepared through the aforementioned acidic procedure are fairly good photocatalysts, as indicated by the results reported in the experimental section below. Thus, the invention also provides a process for preparing non-mixed bismuth oxyhalide of the formula BiOHal, comprising combining a bismuth source and an organic halide salt in an acidic environment to form a precipitate and collecting the solid formed. The preferred process variables and process conditions (e.g., the bismuth source, the acid to be used, the pH of the reaction mixture, the organic halide salt, the separation of the solid from the liquid phase) are as set forth above.

EXAMPLES

Methods

Figure 1A:
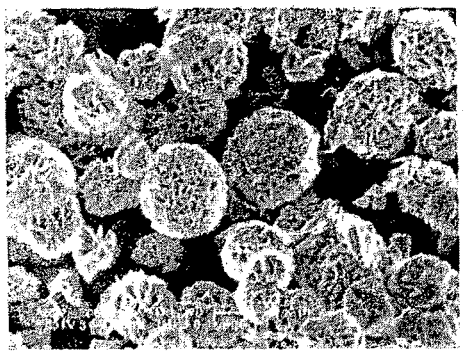
FIGS. 1A to 1G are images produced with a scanning electron microscope showing the flower-like surface morphology of $BiOCl_{0.75}Br_{0.25}$ prepared according to a preferred embodiment of the invention.
Figure 1B:
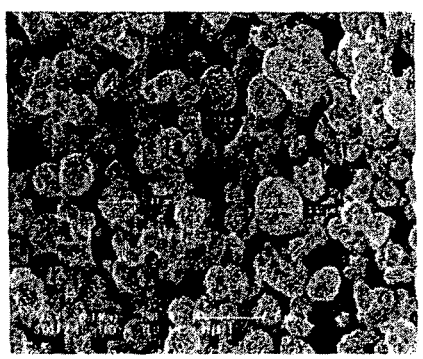
Figure 1C:
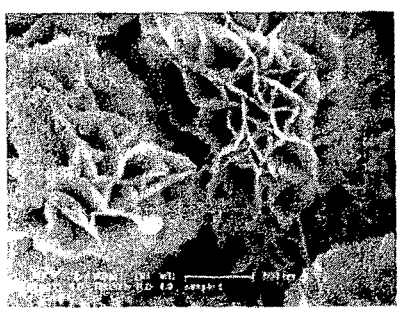
Figure 1D:
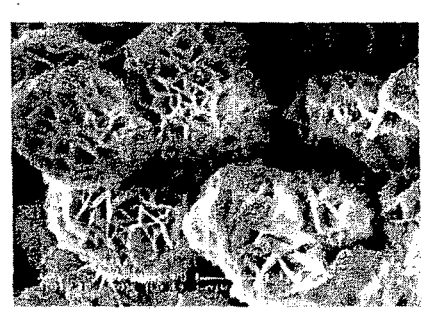
Figure 1E:
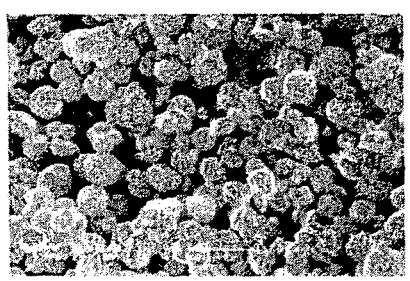
Figure 1F:
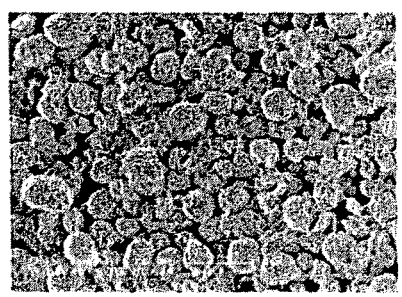
Figure 1G:
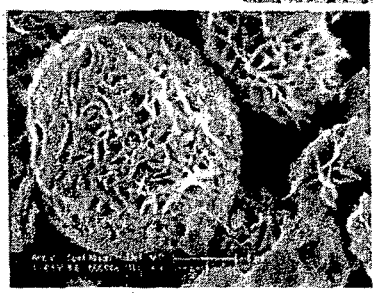
Figure 2A:
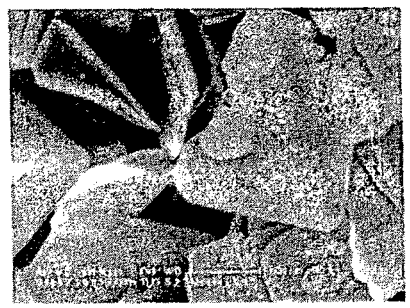
FIGS. 2A to 2G are images produced with a scanning electron microscope showing $BiOCl_{0.75}Br_{0.25}$ particles with plate-like morphology.
Figure 2B:
Figure 2C:
Figure 2D:
Figure 2E:
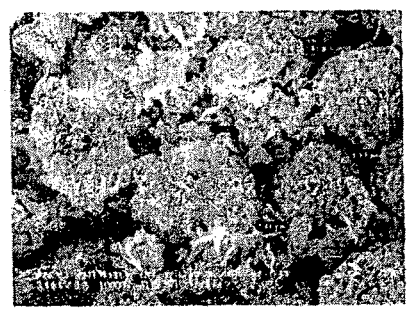
Figure 2F:
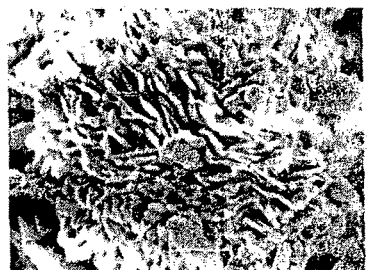
Figure 2G:

XRD measurements were performed on D8 Advance diffractometer (Bruker AXS, Karlsruhe, Germany) with a goniometer radius 217.5 mm, Göbel Mirror parallel-beam optics, 2° Sollers slits and 0.2 mm receiving slit. Low background quartz sample holder was carefully filled with the powder samples. XRD patterns from 5° to 85° 2θ were recorded at room temperature using CuKα radiation (λ=0.15418 nm) with the following measurement conditions: tube voltage of 40 kV, tube current of 40 mA, step scan mode with a step size 0.02° 2θ and counting time of is per step for preliminary study and 12 s per step for structural refinement. The instrumental broadening was determined using $LaB_6$ powder (NIST-660a).

Morphological observations and identification of chemical composition were performed with the HRSEM-High Resolution Scanning Electron Microscope-Sirion (equipped with EDS LN2 detector, Oxford instruments, UK).

Particle size was measured using Malvern Instruments-Mastersizer 2000 particle size analyzer.

Surface area and Pore radius were determined by the N2 Brunauer-Emmett-Teller (BET) method NOVA-1200e).

Example 1

Preparation of $BiOCl_{0.5}Br_{0.5}$ in the Presence of an Acid

Deionized water (80 ml), glacial acetic acid (35 ml) and bismuth nitrate (9.7 g) are added to a flask and mixed at room temperature for fifteen minutes until a clear, transparent solution is formed: CTAB (3.64 g dissolved in 10 ml of water) and CTAC (3.20 g in the form of 25 wt % aqueous solution) are added to the bismuth solution. The solution is then mixed at room temperature for additional 30 minutes. The precipitate formed is separated from the liquid phase by filtration, washed five times with ethanol and five times with water, in order to remove the non-reactive organic species. The solid product is then dried (in air). The weight of the dried solid collected is 7.2 grams. The product may be subjected to heating at 400° C. for approximately 1 hour.

Figure 3:
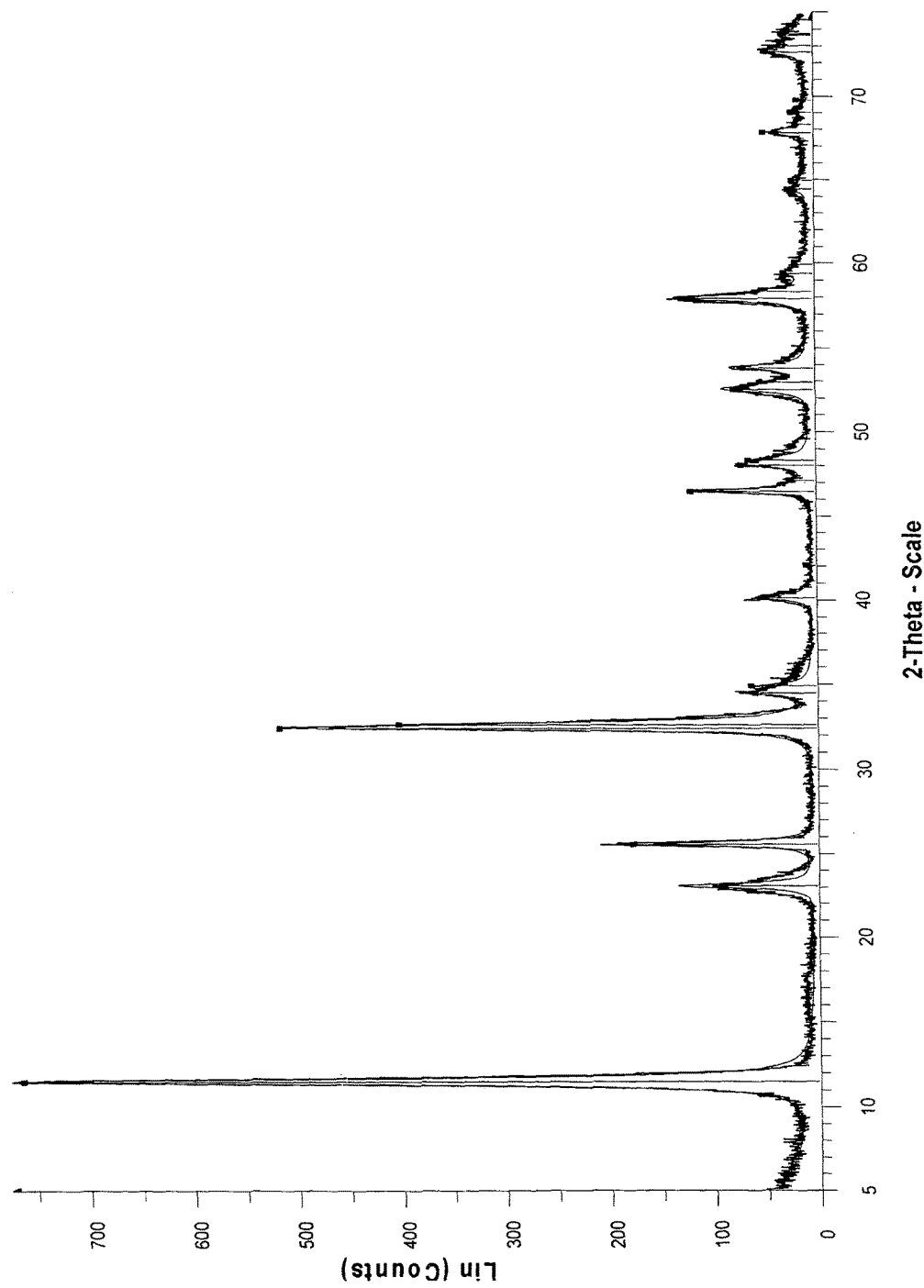
FIG. 3 is a characteristic X-ray powder diffraction pattern of the $BiOCl_{0.5}Br_{0.5}$ compound of the invention.

The X-ray powder diffraction pattern of the resultant bismuth oxyhalide is presented in FIG. 3. The entitled product exhibits X-ray powder diffraction pattern having characteristic peaks at 11.50, 23.05, 25:59, 32.48, 46.55 and 57.92 2θ (±0.05 2θ). The entitled product is characterized by average particle size of 11.30 μm, surface area of 6.00 $m^2/g$ and pore radius of 16 Å.

Example 2

Preparation of $BiOCl_{0.67}Br_{0.33}$ in the Presence of an Acid

Deionized water (60 ml), glacial acetic acid (35 ml) and bismuth nitrate (7.27 g) are added to a flask and mixed at room temperature for fifteen minutes until a clear, transparent solution is formed. CTAB (1.82 g dissolved in 10 ml of water) and CTAC (3.20 g in the form of 25 wt % aqueous solution) are added to the bismuth solution, for additional 30 minutes of mixing at room temperature. The precipitate formed is separated from the liquid phase by filtration, washed five times with ethanol and five times with water, in order to remove the non-reactive organic species. The solid product is then dried (in air). The weight of the solid collected is 6.6 grams. The product may be subjected to heating at 400° C. for approximately 1 hour.

Figure 4:
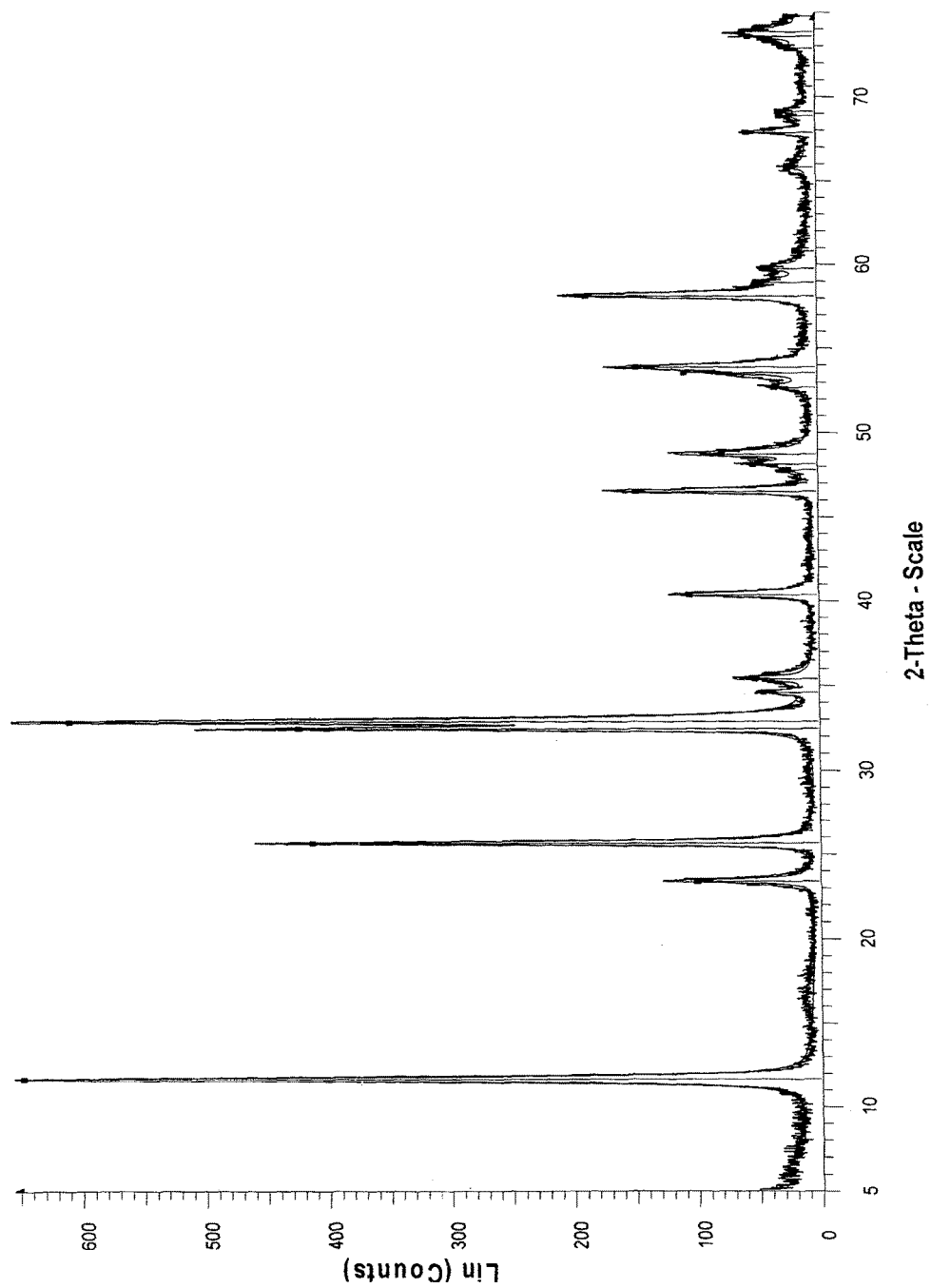
FIG. 4 is a characteristic X-ray powder diffraction pattern of the $BiOCl_{0.67}Br_{0.33}$ compound of the invention.

The X-ray powder diffraction pattern of the resultant bismuth oxyhalide is presented in FIG. 4. The entitled product exhibits X-ray powder diffraction pattern having characteristic peaks at 11.62, 23.46, 25.67, 32.47, 32.91, 46.57 and 58.19 2θ (±0.05 2θ). The entitled product is characterized by average particle size of 4.96 μm, surface area of 16.84 $m^2/g$ and pore radius of 18 Å.

Example 3

Preparation of $BiOCl_{0.75}Br_{0.25}$ in the Presence of an Acid

Deionized water (60 ml), glacial acetic acid (35 ml) and bismuth nitrate (7.35 g) are added to a flask and are mixed at room temperature for fifteen minutes until a clear, transparent solution is formed. CTAB (1.378 g dissolved in 10 ml of water) and CTAC (3.64 g in the form of 25 wt % aqueous solution) are added to the bismuth solution, for additional 30 minutes of mixing at room temperature. The precipitate formed is separated from the liquid phase by filtration, washed five times with ethanol and five times with water, in order to remove the non-reactive organic species. The solid product is then dried (in air). The weight of the solid collected is 6.7 grams. The product may be subjected to heating at 400° C. for approximately 1 hour.

Figure 5:
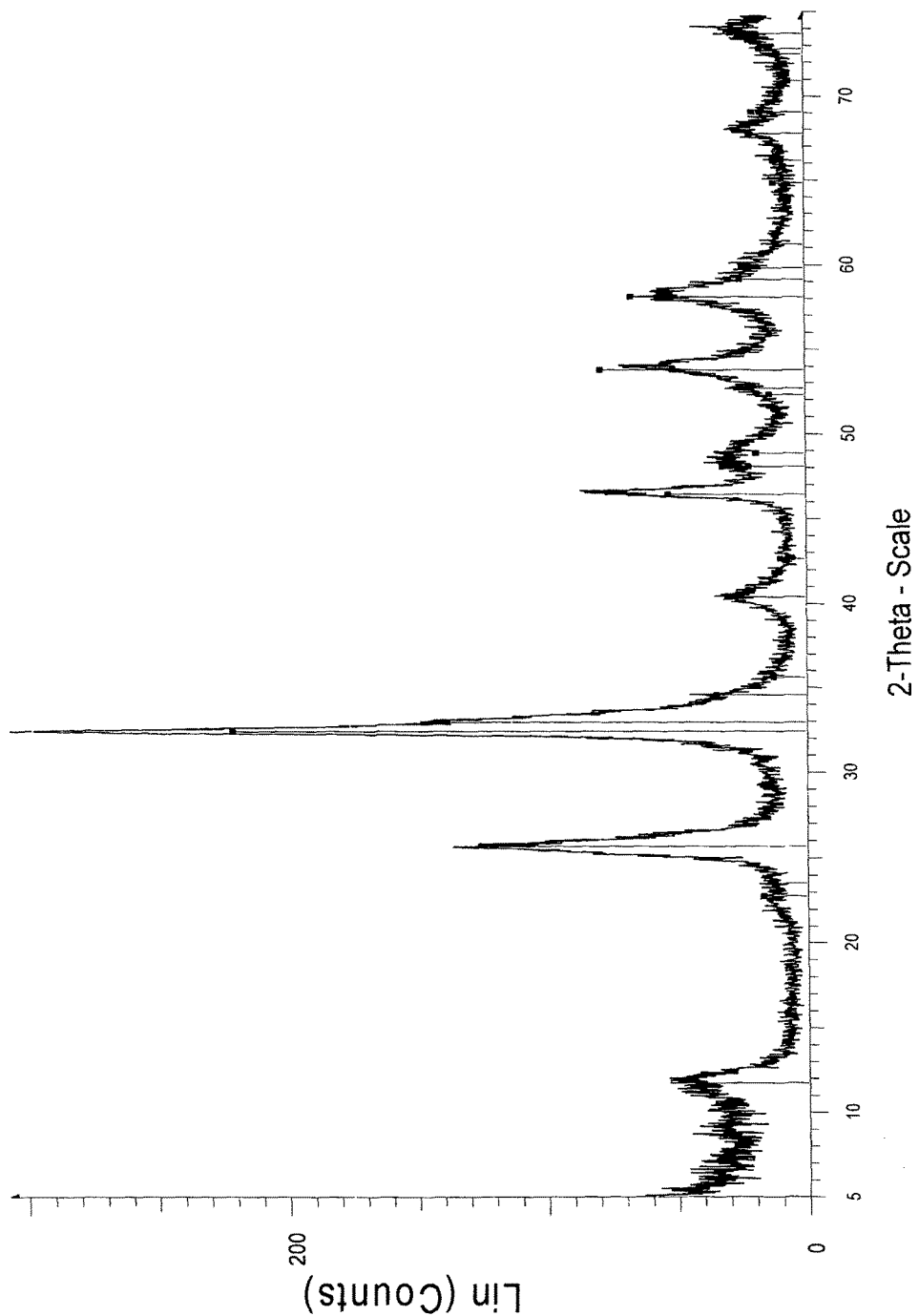
FIG. 5 is a characteristic X-ray powder diffraction pattern of the $BiOCl_{0.75}Br_{0.25}$ compound of the invention.

The X-ray powder diffraction pattern of the resultant bismuth oxyhalide is presented in FIG. 5. The entitled product exhibits X-ray powder diffraction pattern having characteristic peaks at 11.81, 25.69, 32.45, 46.47 and 54.01 2θ (±0.05 2θ). The entitled product is characterized by average particle size of 2.86 μm, surface area of 25.62 m²/g and pore radius of 21 Å.

Example 4

Preparation of $BiOCl_{0.8}Br_{0.2}$ in the Presence of an Acid

Deionized water (75 ml), glacial acetic acid (35 ml) and bismuth nitrate (9.18 g) are added to a flask and mixed at room temperature for fifteen minutes until a clear, transparent solution is formed. CTAB (1.378 g dissolved in 10 ml of water) and CTAC (4.85 g in the form of 25 wt % aqueous solution) are added to the solution, for additional 30 minutes of mixing at room temperature. The white precipitate formed is separated from the liquid phase by filtration, washed five times with ethanol and five times with water, in order to remove the non-reactive organic species. The solid is then dried (in air). The weight of the solid collected is 7 g. The product may be subjected to heating at 400° C. for approximately 1 hour.

Figure 6:
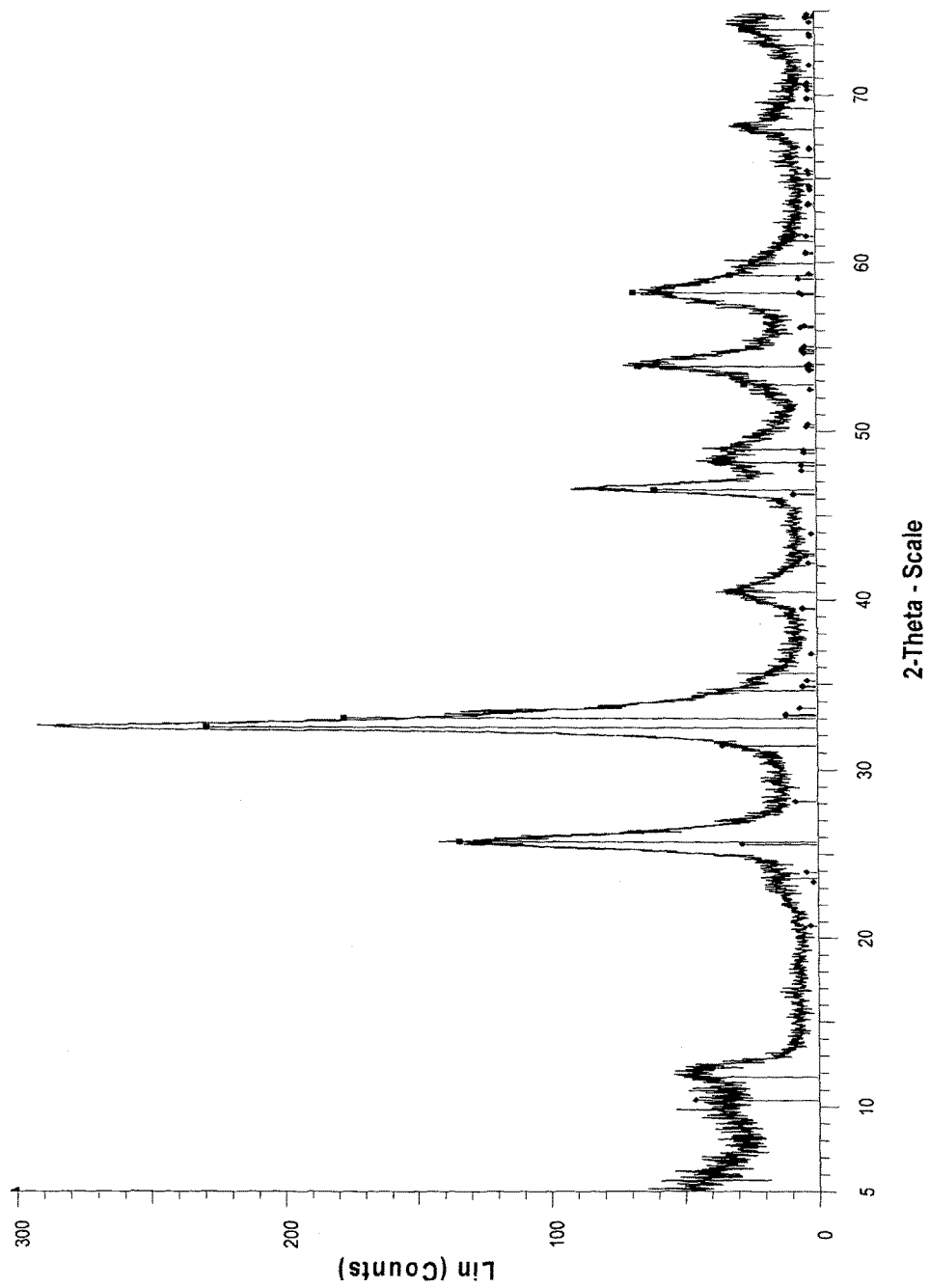
FIG. 6 is a characteristic X-ray powder diffraction pattern of the $BiOCl_{0.8}Br_{0.2}$ compound of the invention.

The X-ray powder diffraction pattern of the resultant bismuth oxyhalide is presented in FIG. 6. The entitled product exhibits X-ray powder diffraction pattern having characteristic peaks at 11.81, 25.68, 32.50, 46.58 and 58.22 (±0.05 2θ). The entitled product is characterized by average particle size of 2.62 surface area of 25.75 m²/g and pore radius of 22 Å.

Example 5

Preparation of $BiOCl_{0.875}Br_{0.125}$ in the Presence of an Acid

Deionized water (85 ml), glacial acetic acid (35 ml) and bismuth nitrate (14.69 g) are added to a flask and are mixed at room temperature for fifteen minutes until a clear, transparent solution is formed. CTAB (1.378 g dissolved in 10 ml of water) and CTAC (8.48 g in the form of 25 wt % aqueous solution) are added to the bismuth solution, for additional 30 minutes of mixing at room temperature. The precipitate thus formed is separated from the liquid phase by filtration, washed five times with ethanol and five times with water, in order to remove the non-reactive organic species. The solid is then dried (in air). The weight of the solid collected is 10.5 grams.

Figure 7:
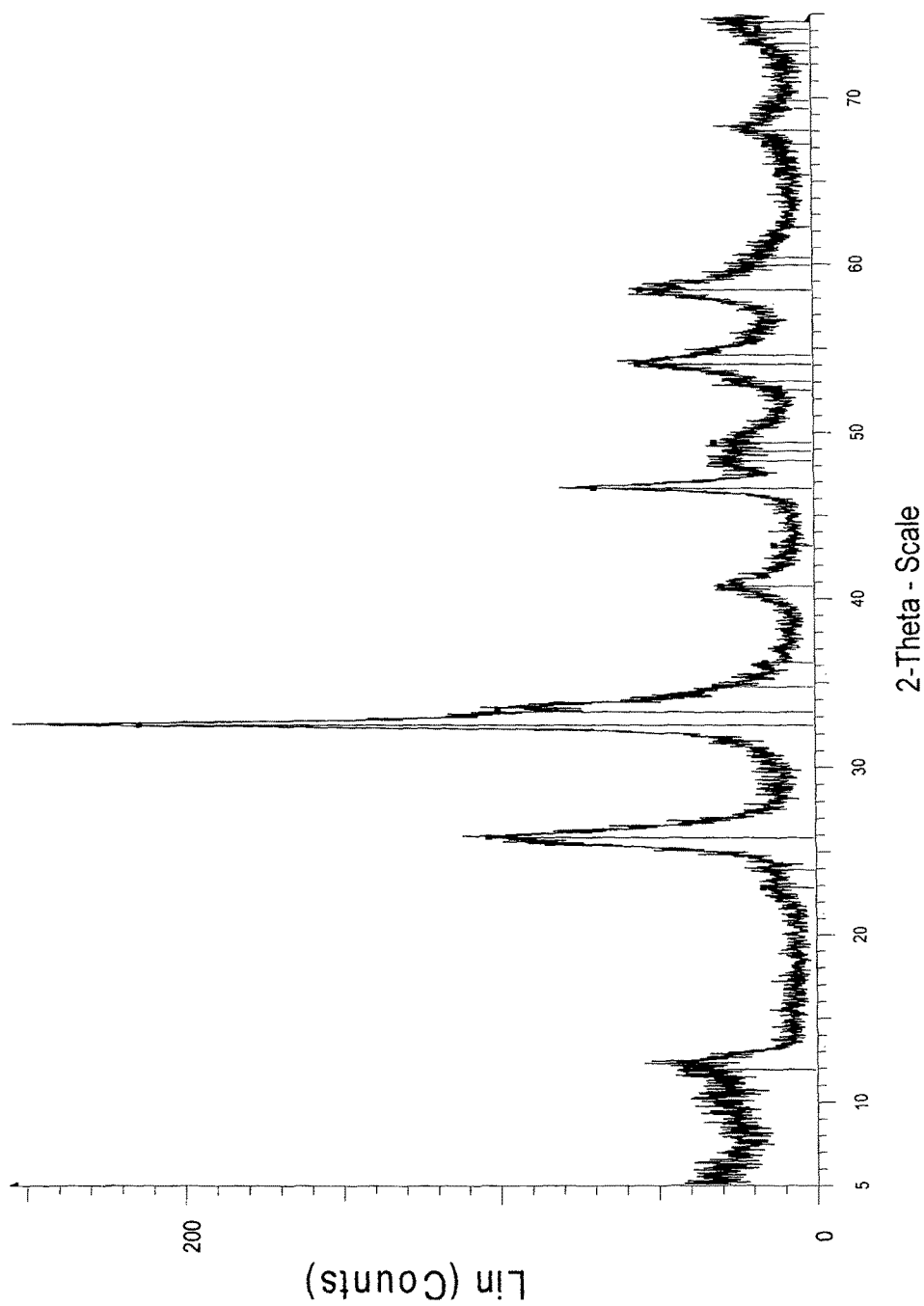
FIG. 7 is a characteristic. X-ray powder diffraction pattern of the $BiOCl_{0.88}Br_{0.12}$ ($BiOCl_{0.875}Br_{0.125}$) compound of the invention.

The X-ray powder diffraction pattern of the resultant bismuth oxyhalide is presented in FIG. 7. The entitled product exhibits X-ray powder diffraction pattern having characteristic peaks at 12.04, 25.86, 32.56, 46.68 and 58.40 2θ (±0.05 2θ). The entitled product is characterized by average particle size of 1.98 μm, surface area of 26.87 m²/g and pore radius of 24 Å.

Example 6

Preparation of $BiOCl_yBr_{1-y}$ Through a Hydrothermal Procedure in the Presence of a Base $BiOCl_yBr_{1-y}$ powders (x=0.1, 0.2, 0.5, 0.7 and 0.8) were prepared according to the following general procedure: $Bi(NO_3)_3 \cdot 5H_2O$ (99.0%) (10 mmol) was mixed with distilled water (40 mL) and stirred at room temperature for 5 min. Subsequently, $NH_4OH$ (30.0%) (17 mL) was added dropwise. The resultant suspension was poured into a stainless steel Teflon-lined autoclave for the hydrothermal treatment. The autoclave was sealed, heated up to 130° C. and held for 14 hours, and was allowed to cool to room temperature. The product was filtered, washed thoroughly with distilled water, and then treated with adjusted amounts of HCl (37%) and concentrated HBr (48%) solutions. The final solid was separated by filtration and dried in air.

Specifically, $BiOCl_yBr_{1-y}$, wherein y is about 0.5, was prepared as follows. The bismuth-containing solid (2.37 g) obtained following the hydrothermal procedure was mixed with 150 mL distilled water, 2 mL concentrated HCl solution and 2 mL concentrated HBr solution in a 250 mL beaker at room temperature for 30 minutes. The solid product was separated by filtration and air-dried to afford the product (2.52 g).

Example 7

Decomposition Test of an Organic Impurity in Aqueous Medium in the Presence of the $BiOCl_yBr_{1-y}$ Compounds of the Invention Each of the compounds of Examples 1 to 5 was tested for its photocatalytic activity in aqueous media with respect to the destruction of Rhodamine B. The photocatalytic activity of the compounds of Examples 1 to 5 was induced by means of four different irradiation methods:
 [1] exposure to direct sunlight; [2] Table PL lamp (11 W) located at a distance of 10 cm from the sample; [3] Xenon lamp (300 W) at wavelength 385-740 nm located at a distance of 10 cm from the sample; and [4] Xenon lamp (300 W) at wavelength 422-740 located at a distance of 10 cm from the sample.

Each of the tested solutions contained 15 ppm of Rhodamine B and 150 mg of the photocatalyst. The time needed for the complete decomposition of Rhodamine B under each of the irradiation methods set forth above was determined by following the disappearance of the pink colored RhB by measuring its concentration at one minute intervals. The concentration of the remnant RhB in the solution during and after the irradiation was analyzed with a UV-Vis spectrophotometer (Varian EL-03097225). The results (expressed as the time required for RhB disappearance) are presented in Table 1.

TABLE 1

|  | Sunlight | Table Lamp | Xenon lamp at wavelength 385-740 nm | Xenon lamp at wavelength 422-740 |
|---|---|---|---|---|
| $BiOCl_{0.5}Br_{0.5}$ (of Example 1) | 15 minutes | 30 minutes | 18 minutes | 18 minutes |
| $BiOCl_{0.67}Br_{0.33}$ (of Example 2) | 10 minutes | 18 minutes | 20 minutes | 10 minutes |
| $BiOCl_{0.75}Br_{0.25}$ (of Example 3) | 3 minutes | 10 minutes | 18 minutes | 3 minutes |
| $BiOCl_{0.80}Br_{0.20}$ (of Example 4) | 3 minutes | 10 minutes | 18 minutes | 3 minutes |
| $BiOCl_{0.875}Br_{0.125}$ (of Example 5) | 2 minutes | 9 minutes | 18 minutes | 2 minutes |

Example 8 (Comparative)

Decomposition Test of an Organic Impurity in Aqueous Medium in the Presence of Either the $BiOCl_yBr_{1-y}$ Compounds of the Invention or Mixed Bismuth Oxyhalides of the Prior Art The following mixed bismuth oxyhalides were prepared according to prior art procedures:

$BiOCl_{0.5}Br_{0.5}$ was synthesized according to the procedure described in the experimental section of Keller et al. [Zeitschrift fuer Naturforschung, B: Chemical Sciences, 60(12), 1255-1263 (2005)]. Mixtures of BiOCl and BiOBr were formed by blending mortared weighed amounts of BiOCl and BiOBr. The mixtures were then heated to 550° C. for 3 days, and were subsequently allowed to solidify. The BiOCl and BiOBr used as starting materials for this procedure were synthesized as described in Preparation 1 and Preparation 2 below, respectively. The SEM images of the resultant $BiOCl_{0.5}Br_{0.5}$ are provided in FIGS. 8A and 8B, which show that the product of Keller et al. exhibits non-organized plate-like surface morphology.

$BiOI_{0.8}Cl_{0.2}$ was synthesized according to the procedure described in the experimental section of Wang et al. [Scripta Materials 56, p. 669-672 (2007)]. It is indicated in that paper that under visible light irradiation, the $BiOI_{0.8}Cl_{0.2}$ possesses the highest photocatalytic activity amongst the mixed iodide-chloride bismuth oxyhalides described in said paper.

$BiOBr_{0.75}I_{0.25}$ was synthesized according to the procedure described in the experimental section of Wang et al. [catalysis Communications 9, p. 8-12 (2008)]. It is noted that the $BiOBr_{0.75}I_{0.25}$ is reported to be the strongest photocatalyst amongst the mixed bismuth bromide-iodide oxyhalides described in said paper.

The photocatalytic activities of the mixed bismuth oxyhalides identified above, and of the $BiOCl_{0.875}Br_{0.125}$ according to Example 5 of the invention, were tested with respect to the decomposition of methyl orange (MO) in aqueous medium. To this end, aqueous solutions containing 10 ppm methyl orange and 100 mg of the tested photocatalyst in 200 ml of water were prepared and irradiated for a period of one hour, with either a UV-Vis light source (λ=385-740 nm) or a visible light source (λ≥422 nm). The degree of decomposition of the organic contaminant (MO) was determined after the one hour, irradiation period by means of measuring its concentration using a UV-Vis spectrophotometer (Varian EL-03097225)].

The results are summarized in Table 2.

TABLE 2

|  | UV-Vis light irradiation (% decomposition) | Visible light irradiation (% decomposition) |
|---|---|---|
| $BiOCl_{0.5}Br_{0.5}$ (Keller et al., 2005) | 1% | 0% |
| $BiOI_{0.8}Cl_{0.2}$ (Wang et al., 2007) | 61% | 54% |
| $BiOBr_{0.75}I_{0.25}$ (Wang et al., 2008) | 59% | 50% |
| $BiOCl_{0.875}Br_{0.125}$ (of Example 5) | 87% | 91% |

Figure 8A:
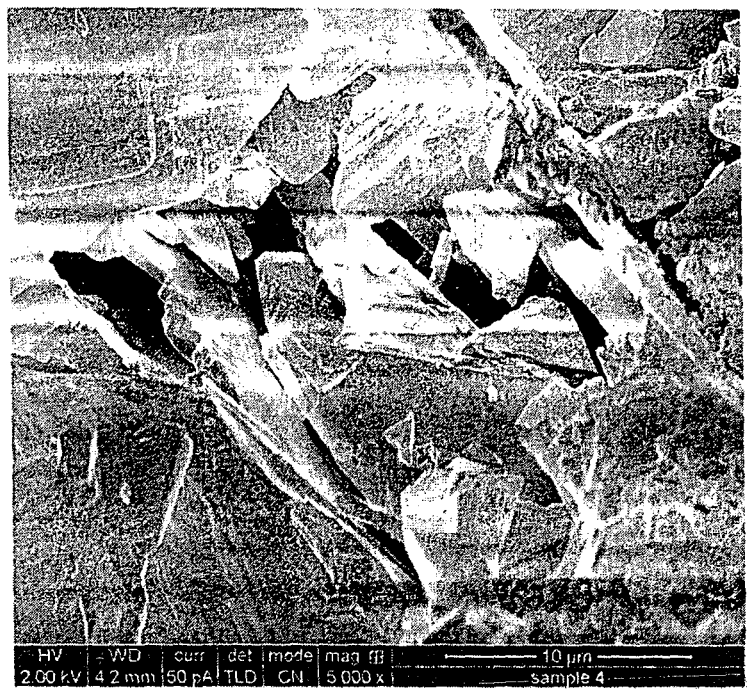
FIGS. 8A and 8B are images produced with a scanning electron microscope showing the morphology of $BiOCl_{0.5}Br_{0.5}$ particles prepared according to Keller et al. (supra).
Figure 8B:
Figure 9A:
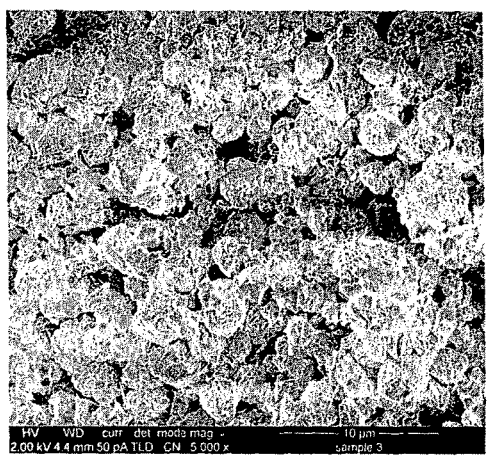
FIGS. 9A to 9C are images produced with a scanning electron microscope showing the flower-like surface morphology of $BiOCl_{0.875}Br_{0.125}$ prepared according to a preferred embodiment of the invention.
Figure 9B:
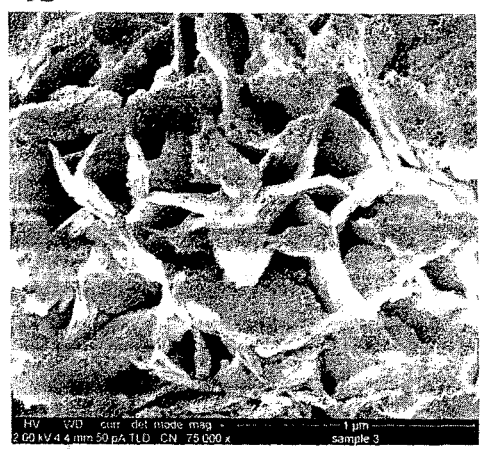
Figure 9C:
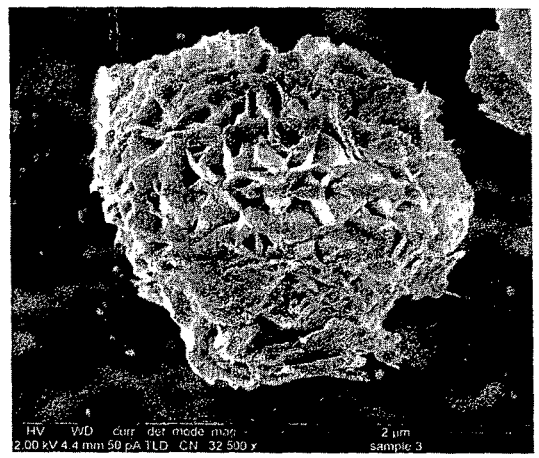

Notably, the mixed chloride-bromide bismuth oxyhalide of Keller et al., which is formed upon solidification of a molten mixture consisting of BiOCl and BiOBr, and is characterized by surface morphology as shown in FIGS. 8A-8B, has been found to be devoid of photocatalytic activity.

The mixed iodide-chloride bismuth oxyhalide having plate morphology according to Wang et al (2007, supra), or the mixed bromide-iodide bismuth oxyhalide according to Wang et at (2008, supra) demonstrate photocatalytic activity. However, it is apparent from the results reported in Table 2 that the mixed chloride-bromide bismuth oxyhalide of the invention, with its flower-like surface morphology, demonstrates significantly better photocatalytic activity both in response to UV-Vis and visible light irradiation.

Example 9

Decomposition Test of an Organic Impurity in Aqueous Medium in the Presence of a $BiOCl_yBr_{1-y}$ Compound of the Invention or (Non-Mixed) BiOCl and BiOBr Prepared by the Method of the Invention Aqueous solutions of Rhodamine B were prepared (15 ppm of RhB dissolved in 200 ml water). The $BiOCl_{0.875}Br_{0.125}$ of Example 5 and pure (non-mixed) bismuth oxychloride and bismuth oxybromide, synthesized according to the procedures set forth in Preparation 1 and Preparation 2 below, respectively, were tested for their ability to completely degrade the dye, in response to either UV-Vis light irradiation or visible light irradiation. The amount of the photocatalyst introduced into each solution was 150 mg. The period of time needed to achieve full decomposition of the dye is set out in Table 3, with respect to the three tested compounds. This period of time was determined by following the disappearance of the pink colored RhB by means of measuring its concentration at one minute intervals. The concentration of the remnant RhB in the solution during and after the irradiation was analyzed with UV-Vis spectrophotometer (Varian EL-03097225).

TABLE 3

|  | UV-Vis light irradiation Time (min) | Visible light irradiation Time (min) |
|---|---|---|
| BiOCl | 29 | 25 |
| BiOBr | 36 | 31 |
| $BiOCl_{0.875}Br_{0.125}$ (of Example 5) | 18 | 2 |

It is noted that the pure (non-mixed) bismuth oxychloride and oxybromide, prepared by the process of the invention, exhibit fairly good photocatalytic activity. Nevertheless, the mixed chloride-bromide bismuth oxyhalide demonstrates superior activity, and is capable of accelerating the decomposition of the dye to a significantly greater extent than the pure (non-mixed) bismuth oxyhalide.

Example 10

Thin Film Formulation

Tetraethyl orthosilicate (TEOS; 5.2 gram), de-ionized water (2.7 gram) and ethanol (6 gram) were mixed together in the presence of nitric acid (pH=2) at 60° C. for 20 minutes. Pluronic P123 (0.15 gram) and poly vinyl alcohol (0.18 gram), both dissolved in 4 gram of ethanol were then added and the stirring continued for an additional hour at 60° C. to form the "glue" solution siloxane.

0.4-0.7 grams of the photocatalyst (of Examples 1-5) was dispersed in 2 gram of ethanol, following which the dispersion was treated with ultrasonic bath for 2 minutes and was then added to the siloxane solution. The resultant mixture is left for 15 minutes under magnetic stirring.

Microscope glass slides were carefully cleaned using acid piranha (a 3:1 mixture of sulfuric acid and hydrogen peroxide). Then, 2-3 drops of the photocatalyst-containing mixture were spread on the clean glass slide using a suitable coating rod or alternatively via the spin coating technique. The coated slide was calcined at oven for 3 hours up to 400° C. (5° C./min), then cooled gradually at room temperature.

The resultant thin coating comprising $BiOCl_{1-y}Br_y$ particles on a glass is highly photoactive, capable of decomposing RhB solution under sun light. 150 mg of the $BiOCl_{1-y}Br_y$ particles in the coating decompose 15 ppm of an aqueous RhB under sun light irradiation within 2 minutes.

Example 11

Magnetic Formulation

Magnetite and sodium silicate (dissolved in 200 ml aqueous acidic solution at molar ratios magnetite: silicate of about 3:1-5:1) are mixed over night at 80° C. The resultant solid particles are silica-coated magnetite.

0.9 gram of the resulting particles (SM) and 0.3 gram of dispersed $BiOCl_{1-y}Br_y$ particles (of Examples 1-5) are transferred to autoclave for a hydrothermal treatment at 95° C. for 6 hours. The product thus formed is a composite of the formula $BiOCl_{1-y}Br_y/(SiOSi)_x/Fe_3O_4$, i.e., a magnetite core coated with silica layer(s), with the photocatalyst particles being provided on the silica coating.

Preparation 1

Preparation of BiOCl

Deionized water (80 ml), glacial acetic acid (35 ml) and bismuth nitrate (9.7 g) are added to a flask and mixed at room temperature for fifteen minutes until a clear, transparent solution is formed. Afterwards, CTAC (6.40 g in the form of 25 wt % aqueous solution) is added to the bismuth solution. The resultant suspension is then mixed at room temperature for additional 30 minutes. The precipitate formed is separated from the liquid phase by filtration, washed five times with ethanol and five times with water, in order to remove the non-reactive organic species. The solid product is then dried (in air). The weight of the dried solid collected is 7.3 grams. The product may be subjected to heating at 400° C. for approximately 1 hour.

Preparation 2

Preparation of BiOBr

Deionized water (80 ml), glacial acetic acid (35 ml) and bismuth nitrate (9.7 g) are added to a flask and mixed at room temperature for fifteen minutes until a clear, transparent solution is formed. Afterwards, CTAB (7.28 g dissolved in 10 ml watery is added to the bismuth solution. The resultant suspension is then mixed at room temperature for additional 30 minutes. The precipitate formed is separated from the liquid phase by filtration, washed five times with ethanol and five times with water, in order to remove the non-reactive organic species. The solid product is then dried (in air). The weight of the dried solid collected is ~7.3 grams. The product may be subjected to heating at 400° C. for approximately 1 hour.

The invention claimed is:

1. Mixed chloride-bromide bismuth oxyhalide compounds having the formula $BiOCl_yBr_{1-y}$, wherein y is between 0.60 and 0.95, in the form of microspheres exhibiting flower-like surface morphology, said microspheres being characterized by the presence of individual thin sheets arranged radially in a petal-like manner, wherein two or more adjacent individual thin sheets are interconnected to form cells or channels which open onto the external surface of said microspheres, as evidenced by images produced by scanning electron microscopy,
   wherein said compounds are photocatalysts and
   wherein the time required for said photocatalysts to completely decompose Rhodamine B in solution is less than 18 minutes when said photocatalysts are added in an amount of 150 mg to 200 ml water containing 15 ppm Rhodamine B and irradiated with a 300 W Xenon lamp at wavelength of 422-740 nm,
   said lamp being located at a distance of 10 cm from said solution, and
   wherein the decomposition of the Rhodamine is determined by a UV-Vis spectrophotometer.

2. The mixed chloride-bromide bismuth oxyhalide compounds according to claim 1, wherein y is between 0.70 and 0.95.

3. A photocatalyst comprising a film applied on a substrate, wherein said film contains the mixed chloride-bromide bismuth oxyhalide compounds as defined in claim 1.

4. A magnetic, photocatalytically active composite comprising a magnetic core having a coating thereon and an outer layer comprising the mixed chloride-bromide bismuth oxyhalide compounds as defined in claim 1 provided on said coating.

5. A method for the purification of water, comprising combining the mixed chloride-bromide bismuth oxyhalide as defined in claim 1 and water contaminated with one or more organic compounds, and irradiating said bismuth oxyhalide with UV-Vis light or visible light, thereby degrading said organic contaminant(s).

6. A method according to claim 5, wherein the mixed chloride-bromide bismuth oxyhalide is provided within a film containing mixed chloride-bromide bismuth oxyhalide compounds, with the molar ratio chloride: bromide being equal to or greater than 1:1, in the form of microspheres exhibiting flower-like surface morphology, said microspheres being characterized by the presence of individual thin sheets arranged radially in a petal-like manner, wherein two or more adjacent individual thin sheets are interconnected to form cells or channels which open onto the external surface of said microspheres.

7. Mixed chloride-bromide bismuth oxyhalide photocatalyst according to claim 1, which decomposes Rhodamine B in less than 10 minutes in the solution.

8. Mixed chloride-bromide bismuth oxyhalide photocatalyst according to claim 7, which completely decomposes Rhodamine B in 2 to 10 minutes in the solution.

* * * * *